United States Patent [19]

Suwald et al.

[11] Patent Number: 5,216,495
[45] Date of Patent: Jun. 1, 1993

[54] COMB FILTER ARRANGEMENT HAVING DELAY TIME COMPENSATION AND LOAD MATCHING IN ALL CIRCUIT PATHS

[75] Inventors: Thomas Suwald; Robert Meyer, both of Hamburg, Fed. Rep. of Germany; Marcel Pelgrom, Helmond, Netherlands

[73] Assignee: U.S. Philips Corporation, New York, N.Y.

[21] Appl. No.: 838,379

[22] Filed: Feb. 19, 1992

[30] Foreign Application Priority Data

Feb. 27, 1991 [DE] Fed. Rep. of Germany ....... 4106076

[51] Int. Cl.⁵ .............................................. H04N 9/78
[52] U.S. Cl. ................................................... 358/31
[58] Field of Search ................................. 358/31, 21 R

[56] References Cited

U.S. PATENT DOCUMENTS 4,920,408  4/1990  Umezawa ............................. 358/31
4,980,737  12/1990 Umezawa ............................. 358/31

Primary Examiner—Mark R. Powell
Attorney, Agent, or Firm—Edward W. Goodman

[57] ABSTRACT

For a comb filter arrangement, for example, for separating a color picture signal into a modulated chrominance subcarrier and a luminance signal, while generating two comb filter function, a one-stage median filter (21) is provided in which the amplitudes of the simultaneously available signals of three picture lines and the two comb filter functions are compared with each other in a comparator stage which supplies logical comparison signals to a selection logic (30) in dependence upon the comparison results. The selection logic (30) constantly determines the signal having the middle instantaneous amplitude of the signals applied to the comparator stage on the basis of the comparison signals, and applies this signal to the medium filter output.

12 Claims, 1 Drawing Sheet

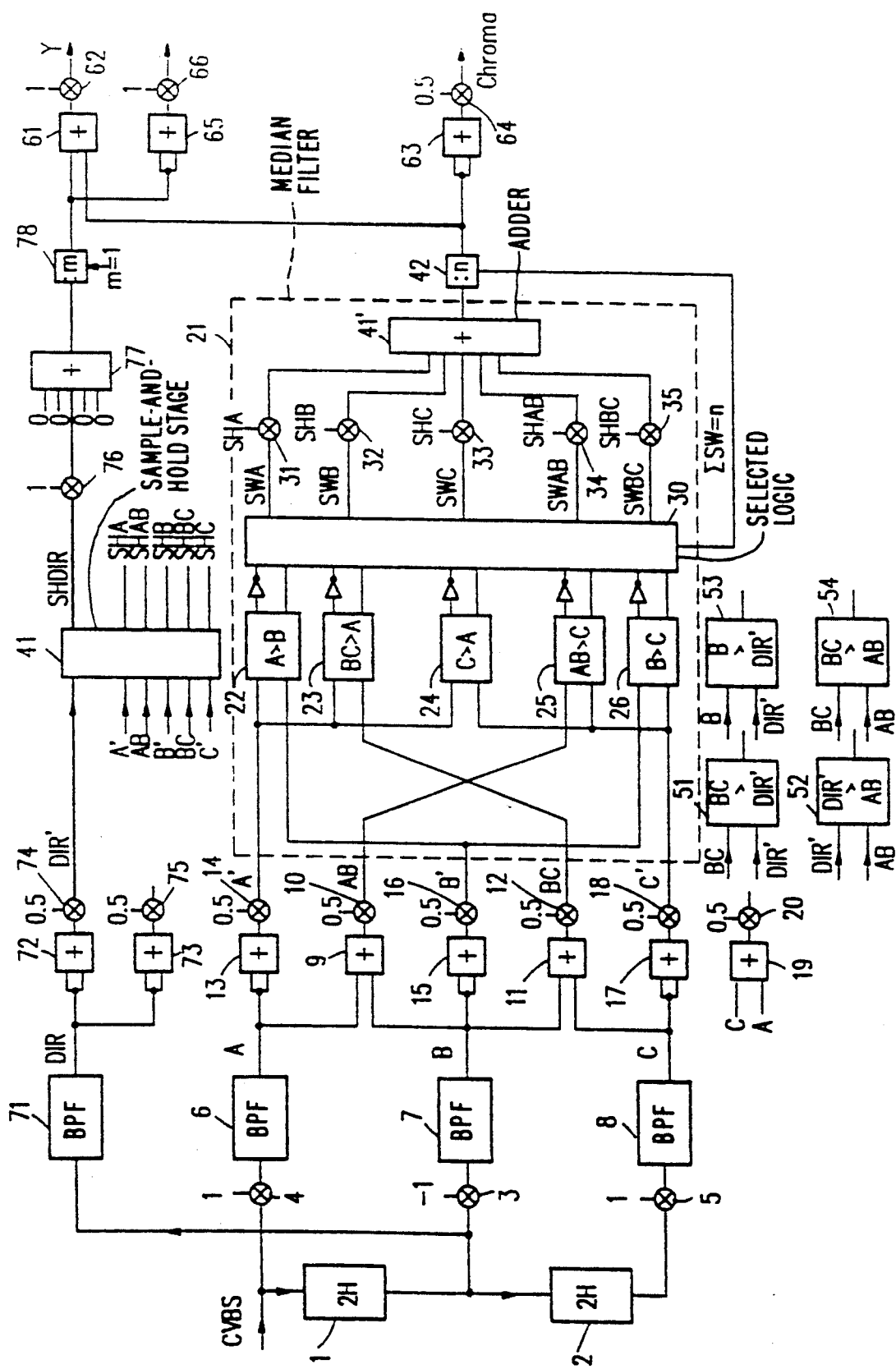

COMB FILTER ARRANGEMENT HAVING DELAY TIME COMPENSATION AND LOAD MATCHING IN ALL CIRCUIT PATHS

BACKGROUND OF THE INVENTION

1. Field of the Invention

The invention relates to a comb filter arrangement, for example for separating a color picture signal into a modulated chrominance subcarrier signal and into a luminance signal, in which arrangement signals of three picture lines, made simultaneously available by means of two successively arranged delay elements which have a delay time of two picture lines for PAL signals and one picture line for NTSC signals, are utilized for obtaining two comb filter functions, and in which arrangement the signal having the median instantaneous amplitude is constantly filtered out of the signals of the three picture lines and the two comb filter functions.

2. Description of the Related Art

Conventional color picture signals, i.e. particularly color television signals carry the chrominance information components incorporated in these signals as a chrominance subcarrier which is modulated in dependence upon these information components. When such color picture signals are displayed, it is a problem to separate this chrominance signal, comprising the chrominance information components as a modulated chrominance subcarrier, from the remainder of the color television signal, particularly from the luminance signal. Simple bandpass filters may be employed for this purpose but they do not manage to fully separate the spectrally interleaved components of the chrominance signal and the luminance signal. Further, comb filters are known with which a picture line is submitted to such a delay that this delayed signal is in anti-phase with the signal of another picture line as far as the chrominance subcarrier components are concerned. These two components are subtracted so that essentially the components of the chrominance subcarrier are left. A separation between the chrominance signal and the luminance signal is possible in this way.

Furthermore, there is an integrated circuit of the type TA 8748 N made by the firm of Toshiba. For NTSC signals two delay elements are provided externally, each element realizing a delay of one picture line. Two comb filter functions are gained from the undelayed and the two delayed signals. From the signals of the actual picture line and the output signals of the two delay elements as well as from the two comb filter functions, the selection of that one out of the five signals that has the middle amplitude is realized in the Toshiba circuit by means of two successively arranged median filters. The problem in this circuit arrangement is that there are different delay times for the five signals of which the signal which has been filtered out appears at the filter output. The reason is that two successively arranged median filters are provided and that some signals only pass through one of the two filters. The resultant different delay times of the signals have negative consequences for the filtering operation because the phase relationship is of extreme importance for the subsequent addition of the filtered chrominance signal to the luminance signal, since the desired effects of cancellation or addition are only produced in an undistorted form when the two signals have an exact phase position with respect to each other.

SUMMARY OF THE INVENTION

It is, inter alia, an object of the invention to provide a comb filter arrangement which produces invariably constant delay times.

According to the invention, this object is solved in that a one-stage median filter is provided in which the amplitudes of the simultaneously available signals of the three picture lines and the two comb filter functions are compared with each other in a comparator stage which supplies logical comparison signals to a selection logic in dependence upon the comparison results, which selection logic constantly determines that signal having the middle instantaneous amplitude of the signals applied to the comparator stage on the basis of the comparison signal and applies that signal to the median filter output.

For filtering the signal having the middle instantaneous amplitude from the signals of the three picture lines as well as of the two comb filter functions, a one-stage median filter is provided which includes a comparator stage in which these five signals are compared and which includes a subsequently arranged selection logic evaluating the comparison signals supplied by the comparator stage. With reference to these comparison signals, the signal having the middle instantaneous amplitude is applied to the output of the median filter. Since the five signals are treated in a uniform manner in this circuit arrangement, their delay time is also identical, thus always resulting in a phase-correct addition of the chrominance signal and the luminance signal.

Since there is a logical dependence between the two comb filter functions and the signals of the three picture lines, thus of the actual picture line as well as of those picture lines provided as output signals by the successively arranged delay elements, a comparison of each of these five signals with all the other signals need not be carried out in the comparator stage. The median filter may thus be relatively simple. According to an embodiment of the invention the comparator stage comprises five comparators each of which compares two signals with each other and supplies a logical output signal in dependence upon the comparison, three comparators being used for comparing the simultaneously available signals of the three picture lines with one another and two comparators being used for comparing the signals of the comb filter functions with that signal of the three picture lines which is not utilized for forming the concerned comb filter function. Thus, five comparators suffice to ensure that, based on the comparison signals supplied by the comparators, the signal having the middle instantaneous amplitude is selected from the five signals in the subsequently arranged selection logic. This is because the comb filter functions already result from the combination of two of the three picture signals so that a logical dependence is given which does not necessitate a full comparison of the five signals.

In a further embodiment of the invention five switching signals are generated in the selection logic, which signals are associated with the simultaneously available signals A, B and C of the three picture lines and with the two signals AB and BC of the comb filter functions and which are gained in accordance with the following logical operations:

$$SW_A = [(A>B) \land (C>A) \land (BC>A)] \lor [(\overline{A>B}) \land (\overline{C>A}) \land (\overline{BC>A})]$$

$$SWB = [(A>B) \wedge (B>C)] \vee [\overline{(A>B)} \wedge \overline{(B>C)}]$$

$$SWC = [(B>C) \wedge (C>A) \wedge \overline{(AB>C)}] \vee [\overline{(B>C)} \wedge \overline{(C>A)} \wedge (AB>C)]$$

$$SWAB = [(B \geq C) \wedge (C>A) \wedge (AB>C)] \wedge [\overline{(B>C)} \wedge \overline{(C>A)} \wedge \overline{(AB>C)}]$$

$$SWBC = [(A>B) \wedge (C>A) \wedge \overline{(BC>A)}] \vee [\overline{(A>B)} \wedge \overline{(C>A)} \wedge (BC>A)]$$

These logical operations performed in the selection logic yield five switching signals. These switching signals do not yet represent the filtered output signal of the median filter, but represent logic switching signals which are respectively associated with the five input signals of the median filter. If one of the five above-mentioned equations in the selection logic is true, the corresponding switching signal is made active and the associated signal of the five input signals of the median filter is applied to the output of this filter. The five signals to be compared thus do not pass the selection logic themselves. Only the above-mentioned logical operations which yield switching signals by means of which the appropriate input signal of the median filter is applied to the median filter output are performed in the selection logic. The selection logic may be formed in such a manner that it always operates with the same time delay, independent of the fact which of the five logical operations yields a true value. Thus the same value always results for the time delay of the output signal of the median filter, which value is also independent of the fact which of the five signals is applied to the median filter output.

A further embodiment of the invention is characterized in that the five switching signals are applied to five switches which apply to the filter output that input signal of the comparator stage of which the associated switching signal is active.

In practice, it may occur under certain circumstances that, for example, two or three signals instead of, as desired, only one of the five signals are applied to the median filter output. For the selection of the signal having the middle instantaneous amplitude there may already be a problem when at least two of the signals have the same instantaneous amplitude. Further problems may occur in that the comparators in the comparator stage have offset errors at their inputs, thus have inputs which switch at different signal levels. It is therefore advantageous to arrange a divider behind the median filter, which divider divides the output signal of the median filter by the number of active switching signals in the case where the selection logic generates several switching signals simultaneously. Thus a mean value is formed from the selected signals, which value replaces the median filter output signal for further signal processing. In this way the problems which occur in the case of equal signals or in the case of different offsets of the comparators in the median filter can be eliminated.

Instead of providing a divider, the switching signals may alternatively be associated with different priority classes and the comparison logic may apply the switching signal having the highest priority if a plurality of switching signals is simultaneously active.

If, for example, due to offset errors in the comparator stage, a plurality of switching signals is to be activated simultaneously on the basis of the logical comparison operations performed in the comparison logic, nevertheless only one of these switching signals is activated. To this end, the switching signals are classified in different priority classes and of the switching signals to be activated on the basis of the comparison operations, only that switching signal which has the highest priority class is actually activated.

In a further embodiment of the invention, the different priorities are realized by means of corresponding comparison operations by the selection logic. It is thereby achieved that already after performing the comparison operations, only one switching signal is to be activated.

The logical operations to be performed for this purpose in the comparison logic for gaining only one switching signal may be advantageously chosen to be as follows:

$$SWA = [(A>B) \wedge (C>A) \wedge (BC>A) \wedge \overline{(B>C)}] \cdot \overline{[(A>B) \wedge (C>A) \wedge (BC>A) \wedge (B>C)]}$$

$$SWB = [(A>B) \wedge (B>C)] \vee [\overline{(A>B)} \wedge \overline{(B>C)}]$$

$$SWC = [(B>C) \wedge (C>A) \wedge \overline{(AB>C)} \wedge \overline{(A>B)}] \vee [(B>C) \wedge (C>A) \wedge (AB>C) \wedge (A>B)]$$

$$SWAB = [(B \geq C) \wedge (C \geq A) \wedge (AB \geq C) \wedge \overline{(A>B)}] \vee [\overline{(B>C) \wedge (C>A) \wedge (AB>C)} \wedge (A>B)]$$

$$SWBC = [(A>B) \wedge (C>A) \wedge \overline{(BC>A)} \wedge \overline{(B>C)}] \vee [\overline{(A>B) \wedge (C>A)} \wedge (BC>A) \wedge (B>C)]$$

In a further embodiment of the invention, delay time compensation elements are provided which give the delayed color picture signal before addition to the separated chrominance signal such an extra delay that the delay times of the signal processing for gaining the separated chrominance signal, particularly of the bandpass filter and the median filter, are compensated.

The circuit arrangement according to the invention ensures that the separated chrominance signal is always available with the same time delay, i.e. always with the same phase value. Consequently, the delayed color picture signal may now also be advantageously delayed by the same value so that a phase-correct addition of the two signals to the luminance signal is always realized.

In a further embodiment of the invention, the signals of the three picture lines are applied to the median filter with such a time delay that they have the same phase position at the median filter input as the two comb filter functions.

In order to provide the possibility of exactly filtering the color picture signal and the phase-correct addition of the separated chrominance signal to the color picture signal, the median filter has a constant delay time. To fully utilize this property of the median filter, it is advantageous to apply the five signals applied to the median filter to the median filter input in mutually equal phase positions. Since a given time is required for generating the two comb filter functions, i.e. these comb filter functions are present with a time delay, the signals of the three picture lines are also delayed by the same time delay value before they are applied to the median filter.

In a further embodiment of the invention, a load compensation is provided which is realized in that the outputs of similar circuit elements parallel processing the signals of the three picture lines and/or the comb filter functions are subjected to equal loads so that possible amplitude errors are avoided.

Circuit elements of different types in an integrated circuit may have a different behavior dependent on the load at their outputs. It is therefore advantageous to equally load the outputs of given similar circuit elements in the circuit arrangement. Possible non-linearities then also occur in a similar way for the five signals. These load compensation elements may of course also be used for the above-mentioned compensation of the different delay times.

The load compensation is ideally realized in that the outputs of the similar circuit elements are loaded with the same number of inputs of subsequently arranged circuit elements whose inputs have a mutually equal electrical behavior. This can be realized, for example, in that mutually similar circuit elements are arranged subsequent to the circuit elements. For example, the five input signals in the comparator stage of the median filter are applied to a different number of comparators. Consequently, the preceding circuit elements are subjeced to a different load. This different load may be compensated for by further comparators which are arranged in such a way that each of the five signals is applied to an equal number of comparator inputs.

This can be realized in a corresponding way for other circuit elements of the circuit arrangement.

In accordance with a further embodiment of the invention, the signals in the circuit arrangement may advantageously be processed in a time-discrete manner. An exactly defined delay time or phase position of the signals is simplified by processing the signals in a time-discrete manner.

BRIEF DESCRIPTION OF THE DRAWING

These and other aspects of the invention will hereinafter be elucidated with reference to an embodiment of the invention which is described with reference to a circuit arrangement shown diagrammatically in a block diagram in the sole FIGURE.

DESCRIPTION OF THE PREFERRED EMBODIMENT

A color picture signal which is denoted by CVBS is applied to the circuit arrangement shown in the Figure. This color picture signal comprises a luminance signal as well as a chrominance signal which is present in the form of a modulated chrominance subcarrier. The circuit arrangement shown in the Figure is to separate these two spectrally interleaved signals. It will hereinafter be assumed that a color picture signal of the PAL standard is applied to the circuit arrangement.

The color picture signal is applied to a first delay element within the circuit arrangement shown in the Figure. This delay element has a delay time which corresponds to the period of two picture lines. As the color picture signal is a PAL signal, the output signal of the first delay element 1 has a phase position opposite to the input signal of the delay element with respect to the chrominance subcarrier components in this signal.

The first delay element 1 preceds a second delay element 2 having the same delay time as the delay element 1. The chrominance signal applied to the circuit arrangement, the output signal of the first delay element 1 as well as the output signal of the second delay element 2, represent the three signals of three picture lines which are simultaneously available. Two comb filter functions are initially gained from the signals of these three picture lines. To this end, the output signal of the first delay element 1 is inverted by the factor of $-1$ by means of multiplication in a multiplier 3. To achieve the same delay times for the signals of the other two picture lines, these signals are multiplied by a factor of 1 in multipliers 4 and 5. Consequently, the three signals are again available in the same phase position at the outputs of the multipliers 3, 4 and 5. These output signals of the three multipliers are now applied to bandpass filters 6, 7 and 8 which are formed in such a way that only that frequency range of its input signal in which spectral components of the modulated chrominance subcarrier occur appears at their outputs. The output signals of the bandpass filters 6, 7 and 8 are denoted by A, B and C in the Figure.

A first comb filter function, which is denoted by AB in the Figure, is now gained from the signals A and B. This is effected by adding the signals AB in an adder 9. For the purpose of level compensation the adder 9 precedes a multiplier 10 which performs a multiplication by the factor of 0.5. The output signal of the multiplier 10 represents the first comb filter function AB. Similarly, a second comb filter function BC is gained from the signals B and C by means of an adder 11 and a multiplier 12. Based on the previously mentioned phase relationship of the chrominance subcarrier components in the signals A and B and B and C, the signals AB and BC represent chrominance signals which have already been filtered out. However, in order to avoid disturbances in the display of the color picture, particularly at horizontal color edges, the signal having the middle instantaneous amplitude must be selected from these two comb filter functions as well as from the signals A, B and C.

For this purpose, the signals A, B and C as well as the comb filter functions AB and BC could be applied to a subsequently arranged median filter. However, since the comb filter functions AB and BC do no longer have the same phase position as the three signals A, B and C due to their passage through an adder and a multiplier, the signals A, B and C are delayed in the same way so that the five signals are subsequently available at the same time and with the same phase. To this end, the signal A passes through an adder 13 and a subsequent multiplier 14 in which a multiplication by a factor of 0.5 is performed. The output signal of the multiplier 14 is denoted by A' in the Figure. In a corresponding manner, the signal B passes through an adder 15 and a multiplier 16 and the signal C passes through an adder 17 and a multiplier 18. Consequently, the signals A', B', C', AB and BC are now available with the same relative phase position for filtering out the signal having the middle instantaneous amplitude.

As already stated, the circuit elements 13 to 18 compensate the delay time of the signals A, B and C. To adapt the load for the outputs of the bandpass filters 6, 7 and 8, the circuit arrangement includes a further adder 19, an input of which receives the signal A and a second input of which receives the signal C. The adder 19 is connected to a multiplier 20 via its output. The adder 19 is particularly used for subjecting the outputs of the bandpass filters 6, 7 and 8 to an equal load. For example, the output of the bandpass filter 7 is loaded by an input of the adder 9, by two inputs of the adder 15 and by an input of the adder 11. However, the output signal of the bandpass filter 6 is only loaded by two inputs of the adder 13 and by one input of the adder 9. This also applies to the output of the bandpass filter 8. In order to subject the outputs of the three bandpass filters to the same number of adder inputs, the output signal of the bandpass filter 6 is additionally loaded by an input of the adder 19. The same applies to the output signal of the bandpass filter 8. As a result, the outputs of the bandpass filters 6, 7 and 8 are loaded in exactly equal ways so that possible nonlinearities for the output signals of the three bandpass filters become equally effective.

The circuit arrangement shown in the Figure includes a median filter 21 which receives the five signals A', B', C', AB and BC. The five signals are now compared in a comparator stage which comprises five comparators 22, 23, 24, 25 and 26. Based on the logical interdependence of the signals, not all signals should be compared with each other. For example, signals A and B are compared in the first comparator 22, signals BC and A are compared in the second comparator 23, signals C and A are compared in the third comparator 24, signals AB and C are compared in the fourth comparator 25 and signals B and C are compared in the fifth comparator 26. Dependent on the results of the comparison, the five comparators 22 to 26 apply comparison signals to a subsequently arranged selection logic 30. For example, the first comparator 22 supplies an output signal if the signal A is larger than the signal B. This comparison signal may be additionally applied in an inverted form to the selection logic 30; this inversion may, however, also be performed within the selection logic 30. The same applies to the further comparators 23 to 26.

Within the selection logic 30, the signal having the middle instantaneous amplitude is determined from the five signals A', B', C', AB and BC with reference to the five or ten comparison signals applied to the selection logic 30 and with reference to five logical equations. Because of the previously elucidated logical interdependence of the five signals, the following five logical operations are to be performed:

$$SWA = [(A>B) \wedge (C>A) \wedge (BC>A)] \vee [\overline{(A>B)} \wedge \overline{(C>A)} \wedge \overline{(BC>A)}]$$

$$SWB = [(A>B) \wedge (B>C)] \vee [\overline{(A>B)} \wedge \overline{(B>C)}]$$

$$SWC = [(B>C) \wedge (C>A) \wedge (AB>C)] \vee [\overline{(B>C)} \wedge \overline{(C>A)} \wedge \overline{(AB>C)}]$$

$$SWAB = [(B>C) \wedge (C>A) \wedge (AB>C)] \vee [\overline{(B>C)} \wedge \overline{(C>A)} \wedge \overline{(AB>C)}]$$

$$SWBC = [(A>B) \wedge (C>A) \wedge (BC>A)] \vee [\overline{(A>B)} \wedge \overline{(C>A)} \wedge \overline{(BC>A)}]$$

With reference to these logical operations, the selection logic 30 generates five switching signals SWA, SWB, SWC, SWAB and SWBC which are respectively associated with the five input signals of the median filter 21. In the ideal case, only one of these five switching signals is active at the same time and thus indicates that the associated input signal has the middle instantaneous amplitude of the five input signals. This associated input signal is therefore applied to the median filter output as long as the corresponding switching signal is active. To this end, the selection logic 30 precedes a multiplier 31 to which the switching signal SWA is applied. The multiplier 31 further receives a signal SHA which represents the time-delayed input signal A' of the median filter 21. This signal A' is delayed in a sample-and-hold stage 41 operating as a delay time compensation element by the value of the delay time with which the switching signal SWA appears at the output of the selection logic 30.

Thus, the multiplier 31 applies the delayed signal A', i.e. the signal SHA, to a subsequently arranged adder 41' during a period of time in which the associated switching signal SWA is active. There are four further multipliers 32, 33, 34 and 35 which, in dependence upon the associated switching signals SWB, SWC, SWAB and SWBC, apply the signals SHB, SHC, SHAB and SHBC, which are also delayed in the sample-and-hold stage 41 to further inputs of the adder 41'. The output signal of the adder 41' represents the filtered signal, i.e. the separated chrominance signal of the color picture signal.

Since the comparators 22 to 26 in the comparator stage of the median filter 21 may have different offsets and since moreover at least two of the input signals of the median filter may have the same instantaneous amplitude, the median filter output precedes a divider 42 by means of which a mean value is formed. This is effected in that the output signal of the adder 41', i.e. the output signal of the median filter 21, is divided by the number of the active switching signals SWA to SWBC by means of the divider 42. For example, if two switching signals are active, these two signals reach the adder and median filter outputs in an added form. The divider 42 divides these signals by two so that as a result a mean value is formed from these two signals.

Instead of forming a mean value, the switching signals SWA to SWBC can be classified in different priority classes. If a plurality of these switching signals are activated by the selection logic 30, the selection logic 30 may precede a priority logic, which is not shown in the Figure, which applies only the switching signal having the highest priority to the adder 41' of the switching signals activated by the selection logic. It is further possible to perform the logical operations in the selection logic 30 in such a way that the different priorities of the switching signals have already been taken into account.

To subject the input signals A', B', C', AB and BC of the median filter 21 to the same electric load, comparators 51, 52, 53 and 54 are provided whose output signals are not evaluated in the circuit arrangement and which are only used for the purpose of subjecting said input signals of the median filter 21 to the same electric load. More specifically, this means that each input signal is applied to an equal number of comparator inputs. Since the five signals are applied to a different number of inputs in the actual circuitry of the median filter 21, a compensation by means of the comparators 51 to 54 is performed in such a way that signals which are applied within the median filter 21 to fewer comparator inputs are applied to additional comparator inputs of the comparators 51 to 54. For this compensation, the two comb filter functions AB and BC are applied to two inputs of the comparators 51 to 54. The signal B' is further applied to an input of the comparator 53.

As already stated hereinbefore, the output signal of the divider 42 represents the separated chrominance signal which, for gaining the luminance signal, is added to the color picture signal delayed by the first delay element 1. To this end an adder 61 is provided which receives the output signal of the divider 42 and a second input of which receives the delayed color picture signal. However, since the separated chrominance signal is time-delayed by the bandpass filters 6 to 8, the adders 9, 11, 13, 15 and 17, the multipliers 10, 12, 14, 16 and 18 as well as the median filter 21 and the divider 42, an equal delay is realized for the output signal of the first delay element 22, i.e. the color picture signal delayed by a period of two picture lines. To make possible nonlinearities of the circuit elements equally effective for this color picture signal as for the separated chrominance signal, corresponding circuit elements are provided. For example, the output of the first delay element 1 precedes a bandpass filter 71 used as a delay element and realizing a delay time compensation which corresponds to the delay time of the bandpass filters 6 to 8. Similarly for the delay time compensation but also simultaneously for the same load of the bandpass filter 71, this filter precedes two adders 72 and 73 having two inputs each. The output signal of the filter 71 is applied to this total number of four inputs of the adders 72 and 73. Consequently, the output signal of the filter 71, likewise as the output signals of the filters 6 to 8, is loaded with four adder inputs.

The adders 72 and 73 precede multipliers 74 and 75, respectively, in which a multiplication by the factor of 0.5 is performed. A delay time compensation, on the one hand, and a matching of the adder outputs is also achieved by these multipliers 74 and 75.

The output signal of the multiplier 74 is applied to the sample-and-hold stage 41 in which it is delayed by the same value as the signals A', B', C', AB and BC. The same delay for the color picture signal as for these signals or the same delay as for the switching signals SWA to SWBC is therefore realized for the color picture signal. In order to load the output of the multiplier 74 in the same way as the outputs of the multipliers 10, 12, 14, 16 and 18, its output signal is also applied to three inputs of the comparators 51, 52, 53.

The color picture signal which is further delayed by means of the sample-and-hold stage 41 is denoted by SHDIR in the Figure and is applied to a multiplier 76 in which this signal is multiplied by a factor of 1. This multiplier is used for achieving a delay time compensation corresponding to the delay times of the multipliers 31 to 35 of the median filter 21. The multiplier 76 precedes an adder 77 which has five inputs, one input of which receives the output signal of the multiplier 76. This adder 77 is also used for realized a delay time compensation or load matching corresponding to that of the adder 41'. The same applies to a divider 78 following the adder 77 and having a corresponding behavior as the divider 42. The output signal of the divider 78 now has an exactly equal phase position and is also influenced in the same way as regards possible non-linearities of the switching elements as the output signal of the divider 42. Thus, in the adder 61 these two signals can be added, ensuring that the separated chrominance signal, on the one hand, and the chrominance components in the color picture signal, on the other hand, are exactly in phase opposition and thus cancel each other a the addition in the adder 61. The output signal of the adder 61 thus represents the filtered luminance signal which is applied to a multiplier 62 only for delay time compensation, in which multiplier it is multiplied by a factor of 1. This filtered luminance signal is denoted by Y in the Figure.

An adder 63 is provided for the separated chrominance signal as delay time compensation for the added 61. The adder 63 precedes a multipler 64 which multiplies the output signal 63 by a factor of 0.5 so as to obtain the original level value again. The multipliers 62 and 64 thus generate equal delay times.

To load the outputs of the dividers 78 and 42 with the same number of adder inputs, the output signal of the divider 78 is applied to two inputs of a further adder 65 which precedes a further multiplier 66.

In the circuit arrangement shown in the Figure, it is ensured, on the one hand, that the separated chrominance signal supplied by the median filter is constantly delayed in this filter by a constant delay, which is independent of the fact which of the five input signals of the median filter has filtered out. Moreover, in all stages of the circuit arrangement, a delay time compensation and a load matching are performed in such a way that corresponding circuit elements within the circuit arrangement, through which signals to be parallel processed pass, are loaded at the output with the same number of similar circuit elements. Thus, possible non-linearities for the signals to be parallel processed appear in a similar way. As a result of this and as a result of the full delay time compensation and the exact phase position of the separated chrominance signal and the delayed color picture signal, an ideal separation of the chrominance signal and the removal of chrominance signal components from the luminance signal can be achieved.

The comb filter arrangement according to the invention is not only applicable in a television signal decoding circuit but also in a television signal encoding circuit for, for example, the PAL-plus television system.

We claim:

1. A comb filter arrangement in which signals A, B, and C of three picture lines, made simultaneously available by means of two successively arranged delay elements which have a delay time of two picture lines for PAL signals and one picture line for NTSC signals, are utilized for obtaining two comb filter functions, AB and BC and in which the signal having the middle instantaneous amplitude is constantly filtered out of the signals of the three picture lines and the two comb filter functions, characterized in that a one-stage median filter is provided in which the amplitudes of the simultaneously available signals of the three picture lines and the two comb filter functions are compared with each other in a comparator stage which supplies logical comparison signals to a selection logic in dependence upon the comparison results, said selection logic constantly determining that signal having the middle instantaneous amplitude of the signals applied to the comparator stage on the basis of the comparison signals and applying that signal to the median filter output.

2. A comb filter arrangement as claimed in claim 1, characterized in that the comparator stage comprises five comparators each of which compares two signals with each other and supplies a logical output signal in dependence upon the comparison, three of said five comparators being used for comparing the simultaneously available signals of the three picture lines with one another, and two of said five comparators being used for comparing the signals of the comb filter functions with that signal of the three picture lines which is not utilized for forming the concerned comb filter function.

3. A comb filter arrangement as claimed in claim 1, characterized in that five switching signals SWA, SWB, SWC, SWAB, and SWBC are generated in the selection logic, said five switching signals being respectively associated with the simultaneously available signals A, B and C of the three picture lines and with the two signals AB and BC of the comb filter functions, and being gained in accordance with the following logical operations:

$$SWA = [(A>B) \wedge (C>A) \wedge (BC>A)] \vee [\overline{(A>B)} \wedge (\overline{C>A}) \wedge (BC>A)]$$

$$SWB = [(A>B) \wedge (B>C)] \vee [\overline{(A>B)} \wedge \overline{(B>C)}]$$

$$SWC = [(B>C) \wedge (C>A) \wedge \overline{(AB>C)}] \vee [\overline{(B>C)} \wedge \overline{(C>A)} \wedge (AB>C)]$$

$$SWAB = [(B>C) \ (C>A) \wedge (AB>C)] \vee [\overline{(B>C)} \wedge \overline{(C>A)} \wedge \overline{(AB>C)}]$$

$$SWBC = [(A>B) \wedge (C>A) \wedge (BC>A)] \vee [\overline{(A>B)} \wedge \overline{(C>A)} \wedge (BC>A)].$$

4. A comb filter arrangement as claimed in claim 3, characterized in that the five switching signals are applied to five switches which apply to the filter output that input signal of the comparator stage of which the associated switching signal is active.

5. A comb filter arrangement as claimed in claim 1, characterized in that the median filter precedes a divider which divides a possible plurality of signals applied to the median filter output by the number of signals applied to the median filter output and which makes the divider output signal instead of the filter output signal available for further signal processing.

6. A comb filter arrangement as claimed in claim 1, wherein five switching signals SWA, SWB, SWC, SWAB, and SWBC are generated in the selection logic, said five switching signals being respectively associated with the simultaneously available signals A, B, and C of the three picture lines and with the two signals AB and BC of the comb filter functions, characterized in that the switching signals are classified in different priority classes and in that the selection logic applies only the switching signal having the highest priority if a plurality of switching signals is simultaneously active.

7. A comb filter arrangement as claimed in claim 6, characterized in that the different priorities are realized by means of corresponding comparison operations by the selection logic.

8. A comb filter arrangement as claimed in claim 7, characterized in that the following logical operations for gaining a switching signal are performed in the selection logic:

$$SWA = [(A>B) \wedge (C>A) \wedge (BC>A) \wedge \overline{(B>C)}] \vee [\overline{(A>B)} \wedge \overline{(C>A)} \wedge (BC>A) \wedge (B>C)]$$

$$SWB = [(A>B) \wedge (B>C)] \vee [\overline{(A>B)} \wedge \overline{(B>C)}]$$

$$SWC = [(B>C) \wedge (C>A) \wedge \overline{(AB>C)} \wedge \overline{(A>B)}] \vee [\overline{(B>C)} \wedge \overline{(C>A)} \wedge (AB>C) \wedge (A>B)]$$

$$SWAB = [(B>C) \wedge (C>A) \wedge (AB>C) \wedge \overline{(A>B)}] \vee [\overline{(B>C)} \wedge \overline{(C>A)} \wedge (AB>C) \wedge (A>B)]$$

$$SWBC = [(A>B) \wedge (C>A) \wedge \overline{(BC>A)} \wedge \overline{(B>C)}] \vee [\overline{(A>B)} \wedge \overline{(C>A)} \wedge (BC>A) \wedge (B>C)].$$

9. A comb filter arrangement as claimed in claim 1, characterized in that delay time compensation elements are provided which give the delayed color picture signal, before addition to the separated chrominance signal, such an extra delay that the delay times of the signal processing for gaining the separated chrominance signal, particularly of the bandpass filters and the median filter are compensated.

10. A comb filter arrangement as claimed in claim 1, characterized in that the signals of the three picture lines are applied to the median filter with such a time delay that they have the same phase position at the median filter input as the two comb filter functions.

11. A comb filter arrangement as claimed in claim 1, characterized in that a load compensation is provided which is realized in that the outputs of similar circuit elements parallel processing the signals of the three picture lines and/or the comb filter functions are subjected to equal loads.

12. A comb filter arrangement as claimed in claim 11, characterized in that the load compensation is realized in that the outputs of the similar circuit elements are loaded with the same number of inputs of subsequently arranged circuit elements whose inputs have a mutually equal electrical behavior.

* * * * *